(12) United States Patent  (10) Patent No.: US 8,280,449 B2
Yen et al.                  (45) Date of Patent:     Oct. 2, 2012

(54) AUDIO USAGE DETECTION

(75) Inventors: Kuan-Chieh Yen, Northville, MI (US); Rogerio Guedes Alves, Macomb, MI (US)

(73) Assignee: Cambridge Silicon Radio Limited, Cambridge (GB)

( * ) Notice: Subject to any disclaimer, the term of this patent is extended or adjusted under 35 U.S.C. 154(b) by 1041 days.

(21) Appl. No.: 12/238,624

(22) Filed: Sep. 26, 2008

(65) Prior Publication Data

US 2010/0081482 A1    Apr. 1, 2010

(51) Int. Cl.
*H04M 1/00*   (2006.01)
*H04B 1/38*   (2006.01)

(52) U.S. Cl. .............. 455/569.1; 455/569.2; 455/570

(58) Field of Classification Search ........... 455/569.2, 455/575.9, 95, 414.4, 221, 73, 90.2, 90.3, 455/43, 313, 570, 213, 296, 297, 306, 307, 455/569.1
See application file for complete search history.

(56) References Cited

U.S. PATENT DOCUMENTS 5,696,821 A * 12/1997 Urbanski ............... 379/406.07
5,777,991 A *  7/1998 Adachi et al. .............. 370/352

* cited by examiner

*Primary Examiner* — Eugene Yun
(74) *Attorney, Agent, or Firm* — Novak Druce DeLuca + Quigg LLP

(57) ABSTRACT

An audio handling device comprising: a source of audio data; a microphone; a loudspeaker; a transmitter for transmitting audio data; modification means for modifying the audio data; and a control unit for controlling the operation of the device, the control unit being capable of receiving signals from the microphone and configuring the conveying of audio data from the source to one or both of the loudspeaker and the transmitter; the control unit being capable of configuring the device such that during at least a probing period the modification means modifies audio data from the source and the modified audio data is transmitted by the transmitter, and being arranged to select in dependence on data dependent on signals received from the microphone whether to apply audio data from the source to the loudspeaker.

23 Claims, 4 Drawing Sheets

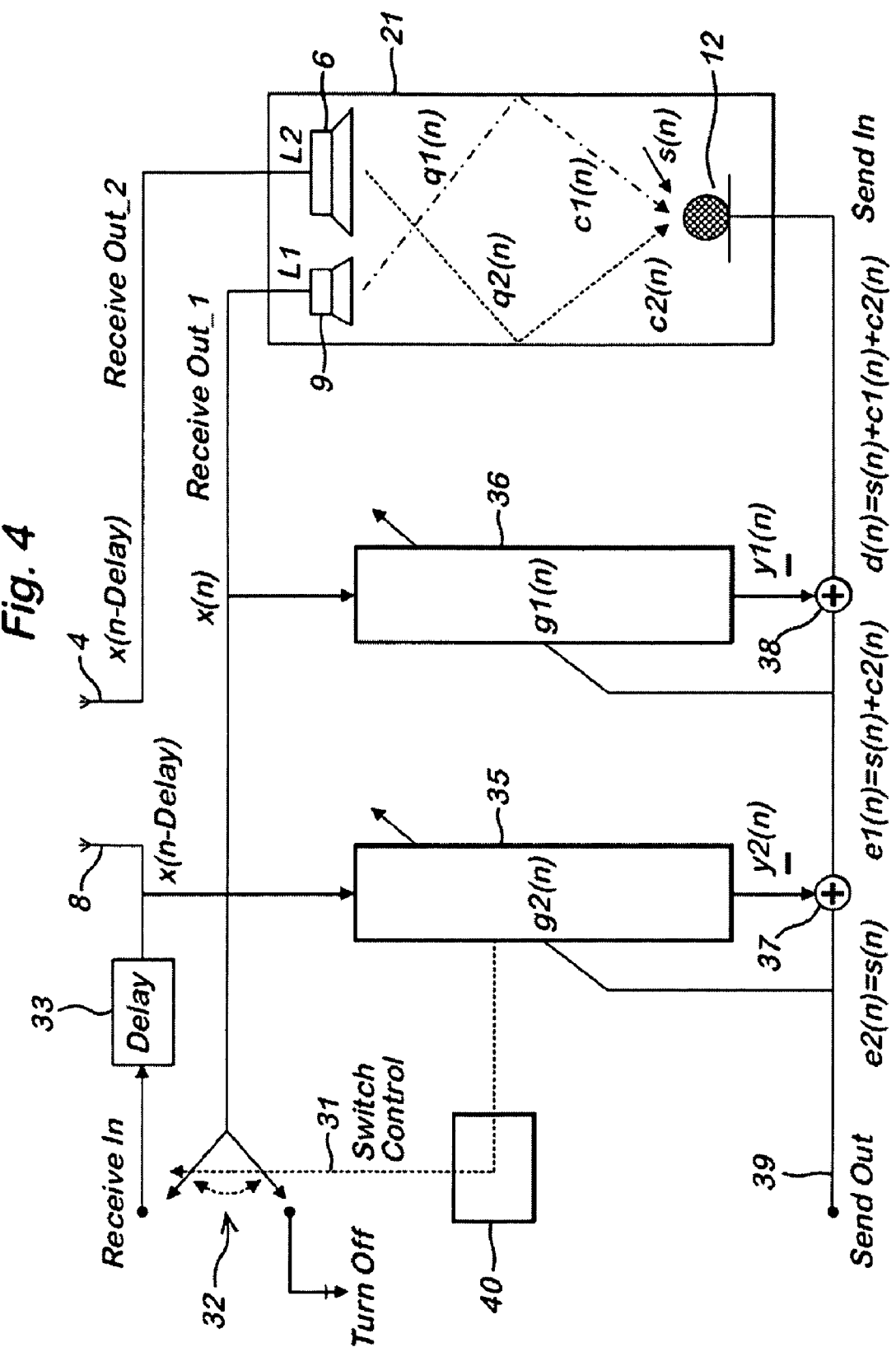

AUDIO USAGE DETECTION

BACKGROUND OF THE INVENTION

This invention relates to detecting the usage of a particular audio stream. It is especially useful for detecting whether a device is tuned to a particular radio channel. In a preferred embodiment of the invention that knowledge could be used to trigger whether a hands-free cellular telephone transceiver forwards audio data through that channel and/or switches on its own loudspeaker. This may allow audio data to be presented to the user but avoid presenting audio data through duplicated channels.

FIG. 1 shows the architecture of a device that includes a cellular telephone transceiver and that is installed in a vehicle. The device could be a car kit accessory or could be integrated with the car or its hi-fi system. The device 1 is installed in a vehicle 2 which also has an in-car audio system. The audio system includes a head unit 3 which can receive or generate audio from various sources. In this example the head unit includes an FM radio receiver 4 for receiving FM radio signals and a CD player 5 for playing CDs. The audio system also has loudspeakers 6 through which it can play out audio from the sources. The car kit includes a two-way audio interface 7 (e.g. a cellular telephone transceiver), an FM radio transmitter 8, a loudspeaker 9, a one-way audio interface 10 and a manual switch 11. The one-way interface could, for example, be a Bluetooth receiver for receiving audio from a nearby Bluetooth device such as a cellular phone, or it could be an FM receiver for receiving FM signals. The car kit can take audio input either from radio channels received by radio receiver 10 or from audio received in a phone call by two-way interface 7. Switching between these will typically happen automatically depending on whether a phone call is in progress. Devices 7 and 10 could be integrated together.

The car kit can provide audio output either through loudspeaker 9 or (via FM transmitter 8 and FM receiver 4) through the loudspeakers 6 of the in-car audio system. Switching between these is dependent on the state of manually operable switch 11. Thus, in one of the car kit's output modes the audio input devices 7 and 10 are connected by switch 11 to the loudspeaker 9 of the car kit so that received audio is played out through the loudspeaker 9 of the car kit. In the other of the car kit's output modes the audio input devices 7 and 10 are connected by switch 11 to the FM transmitter 8 so that it can be received by the FM receiver 4 and then played out by the audio system over loudspeakers 6. The second mode is convenient because the loudspeakers 6 of the audio system typically provide better performance than the loudspeaker 9 of the car kit, and there is no need for the user to separately mute the audio system in order to listen to the call. However, the second mode will only work if the audio system is using its FM receiver 4 as input and if that FM receiver 4 is tuned to the same channel as the FM transmitter 8 is configured to transmit on. Since the car kit 1 does not know whether that is the case, the switch 11 allows the user to manually configure which of the two modes the car kit is to operate in.

The fact that the user has to manually configure the car kit to select an input mode is inconvenient for the user, especially since he might prefer to alter such a configuration whilst driving the vehicle. The switch adds to the cost of the car kit. Using loudspeaker 9 unnecessarily might drain the energy of the car kit, which is especially relevant if it is battery-powered. Therefore, it would be advantageous if the car kit could automatically determine which mode to operate in.

A microphone 12 may provide input to a digital signal processor 13 for performing echo cancellation when a user is engaged in a phone call. This operation will be described with reference to FIG. 2.

FIG. 2 illustrates the acoustic environment inside a vehicle such as the vehicle of FIG. 1. In this environment a receive-in signal $x(n)$ is sent to a loudspeaker 20 (which could be one of loudspeakers 6 or 9) inside the body 21 of the vehicle. This signal propagates within the interior of the vehicle through an acoustic path $q(n)$ and feeds back into a microphone 22 (which could be microphone 12) to generate an echo signal $c(n)$. $c(n)=q(n)*x(n)$, where '*' represents the convolution operation. The total input $d(n)$ to the microphone will include the echo signal $c(n)$ and also an external input signal $s(n)$ which represents audio generated from other sources such as speech within the vehicle or engine noise.

An acoustic echo cancellation (AEC) system can be used to cancel the echo signal $c(n)$ from the microphone signal $d(n)$ in order to obtain an estimate of the external signal $s(n)$. This operation may, for example, be done to identify the signal $s(n)$ as a near-end speech signal for transmitting to the remote party on a phone call. Separating signal $c(n)$ from signal $s(n)$ is known as the AEC problem. The objective of a system that is to solve the AEC problem is to simulate the acoustic echo path $q(n)$ and then subtract the simulated path response $y(n)$ from the microphone signal $d(n)$ to yield a signal $e(n)$ that is an estimate of the signal $s(n)$. The path response can be simulated using an adaptive filter $g(n)$ which takes the signal $x(n)$ that is input to the loudspeaker as input and yields a response $y(n)$. It can be seen that if the adaptive filter correctly simulates the acoustic path (i.e. if $g(n)=q(n)$) then $y(n)=c(n)$, and subtracting the output signal of the adaptive filter $y(n)$ from the microphone signal $d(n)$ will fully cancel the echo signal $c(n)$. In practice the characteristics of $q(n)$ are not known so typically the response of the filter $g(n)$ is adapted (e.g. based on $e(n)$) with the aim of best simulating $q(n)$. Algorithms for adapting the filter response to best simulate $q(n)$ are well-known: see, for example: R. G. Alves and K. Yen, "Method and System for Clear Signal Capture," U.S. Pub. No. 2006/0034447, Feb. 16, 2006, incorporated herein by reference in its entirety; B. Widrow and S. D. Sterns, "Adaptive Signal Processing," Prentice-Hall, 1985; S. Haykin, "Adaptive Filter Theory," Prentice-Hall, 2002.

SUMMARY OF THE INVENTION

According to one aspect of the present invention there is provided an audio handling device comprising: a source of audio data; a microphone; a loudspeaker; a transmitter for transmitting audio data; modification means for modifying the audio data; and a control unit for controlling the operation of the device, the control unit being capable of receiving signals from the microphone and configuring the conveying of audio data from the source to one or both of the loudspeaker and the transmitter; the control unit being capable of configuring the device such that during at least a probing period the modification means modifies audio data from the source and the modified audio data is transmitted by the transmitter, and being arranged to select in dependence on data dependent on signals received from the microphone whether to apply audio data from the source to the loudspeaker.

According to a second aspect of the present invention there is provided an audio handling device comprising: a source of audio data; a microphone; a loudspeaker; a transmitter for transmitting audio data; a first audio path carrying the audio data; modification means for modifying the audio data; and a control unit for controlling the operation of the device, the control unit being capable of receiving signals from the microphone and configuring the conveying of audio data from the source to one or both of the loudspeaker and the transmitter; the control unit being capable of configuring the device such that during at least a probing period the modification means modifies audio data from the source, one of the audio data from the source and the modified audio data is transmitted by the transmitter and the other is applied to the loudspeaker, and being arranged to select in dependence on data dependent on signals received from the microphone whether to subsequently apply audio data from the source to the loudspeaker.

The modification may be a delay.

The control unit may comprise an echo cancellation unit for cancelling detected echo components in a signal received from the microphone. It may be configured to do so by comparing a signal received from the microphone with a known signal. The said data dependent on signals received from the microphone may comprise the configuration of the echo cancellation unit.

The control unit may be capable of configuring the device such that during at least the probing period audio data from the source is applied to the loudspeaker.

The control unit may comprise a first adaptive filter coupled so as to form a first filter signal in dependence on a signal applied to the loudspeaker, said first filter signal representing a version of the signal applied to the loudspeaker delayed by a first amount. The first filter may be arranged so as to adjust the said first amount so as to minimise the energy of a signal representing the difference between a signal received at the microphone and the first filter signal.

The control unit may comprise a second adaptive filter coupled so as to form a second filter signal in dependence on a signal applied to the transmitter, said second filter signal representing a version of the signal applied to the transmitter delayed by a second amount. The second filter may be arranged so as to adjust the said second amount so as to minimise the energy of a signal representing the difference between a signal received at the microphone and the first and second filter signals.

The said data dependent on signals received from the microphone may comprise or define the configuration of the second filter.

The source of audio data may be a radio receiver.

The source of audio data may be a Bluetooth radio receiver.

The source of audio data may be capable of connecting to a telephone. The control unit may be configured to automatically begin the said probing period when the source of audio data is signalled by the telephone that a telephone call has commenced.

The device may be a car kit.

The modification may be the addition of a waveform to the audio data from the source. The waveform may represent a sound that is audible.

The present invention will now be described by way of example with reference to the accompanying drawings.

BRIEF DESCRIPTION OF THE DRAWINGS

FIG. 4 illustrates signal flow in an embodiment of the present invention.

DETAILED DESCRIPTION OF THE INVENTION

In the embodiments of the invention to be discussed below instead of a manual switch the switching is performed automatically by software or hardware based on input received from a digital signal processing (DSP) algorithm. The DSP algorithm undergoes a process to estimate whether the vehicle's radio is turned on and tuned to a radio station that is being transmitted by the car kit. It does this based on analysis of the audio environment in the vehicle.

Figure 1:
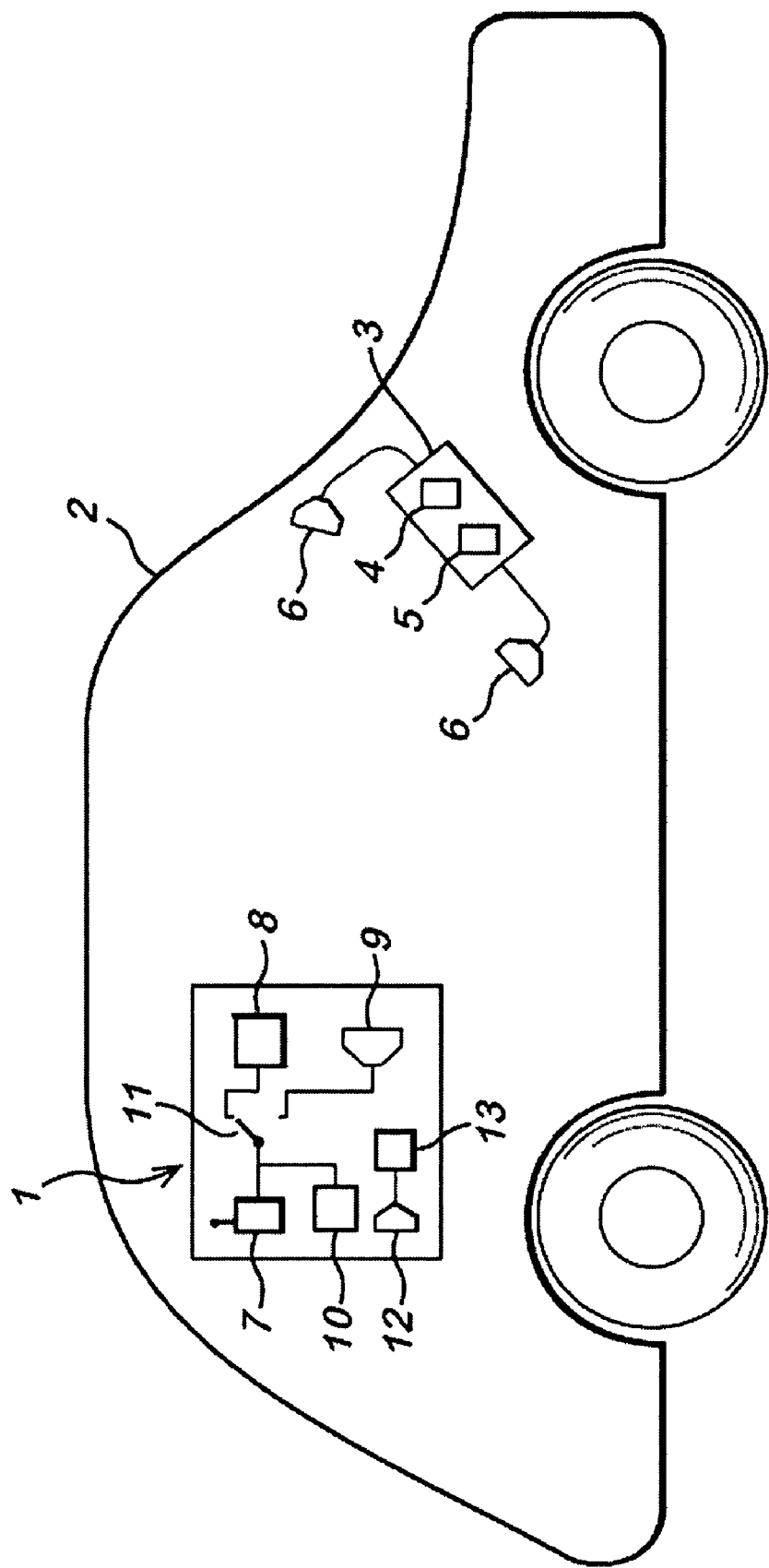
FIG. 1 shows the architecture of a hands-free car kit that includes a cellular telephone transceiver and that is installed in a vehicle.
Figure 3:
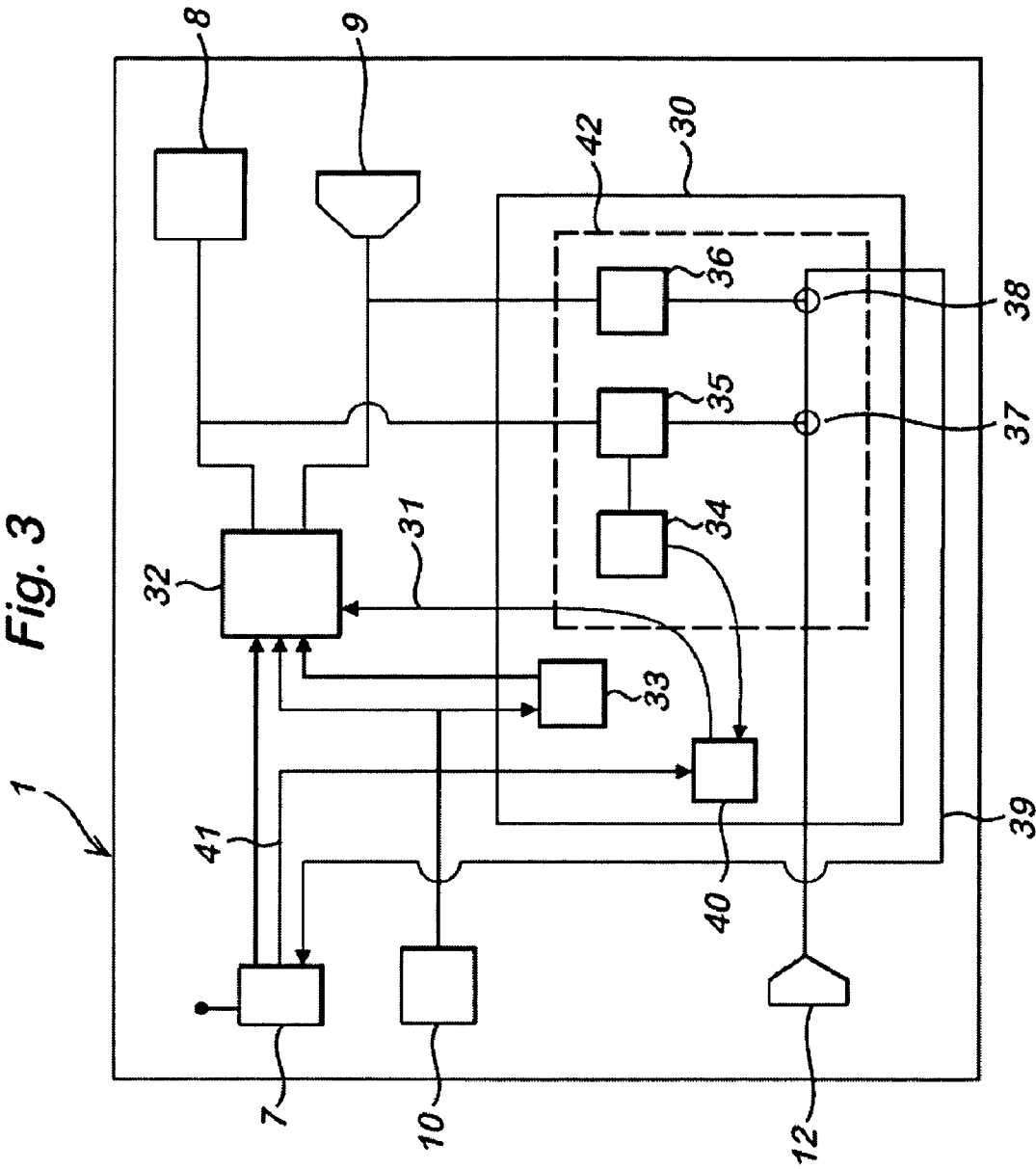
FIG. 3 shows the architecture of another hands-free car kit suitable for installation in a vehicle in a similar way to the car kit of FIG. 1.

FIG. 3 shows the architecture of a hands-free car kit that includes a cellular telephone transceiver. The car kit of FIG. 3 may be installed in a vehicle in a similar way to the car kit of FIG. 1. In the car kit of FIG. 3 like components are numbered as in FIG. 1. In comparison to the car kit of FIG. 1 the car kit of FIG. 3 includes a digital signal processor (DSP) 30 for processing the audio received by the microphone 12 from the interior of a vehicle and generating an output at 31 to an automatic switching unit 32 which takes the place of the manual switch 11 of FIG. 1. In dependence on input from the DSP 30 the switching unit 32 can switch the car kit between a first mode (in which input audio from the phone transceiver 7 or from the car kit—e.g. from its receiver 10—is played through the loudspeaker 9 of the car kit) and a second mode (in which such input audio is passed to the FM transmitter 8 so that it can be played through the loudspeakers 6 of the vehicle's audio system). The DSP automatically determines whether the vehicle's audio system is generating audio from the FM transmitter 8 and ensures that the switch 32 is set appropriately when an incoming call is received by transceiver 7.

The algorithm used by the DSP 30 is described below. In essence, the DSP causes a modification to be applied to audio that is relayed by FM transmitter 8 of the car kit, e.g. having been received by the receiver 10 of the car kit. The DSP then attempts to identify that modification in audio sensed in the interior of the vehicle using the microphone 12 of the car kit. If such a modification is detected then it can be assumed that the car's audio system is receiving signals from the FM transmitter 8 and is playing them in the vehicle. In that situation the DSP causes the audio of a phone call to be played via the FM transmitter 8. Otherwise it causes the audio of a phone call to be played over the loudspeaker 9 of the car kit. The modification is preferably a delay, since that does not involve a distortion of the audio of the received FM signal. The modification can be made continuously, but more preferably it is only made whilst the DSP is probing the vehicle to determine the state of the audio system.

Figure 2:
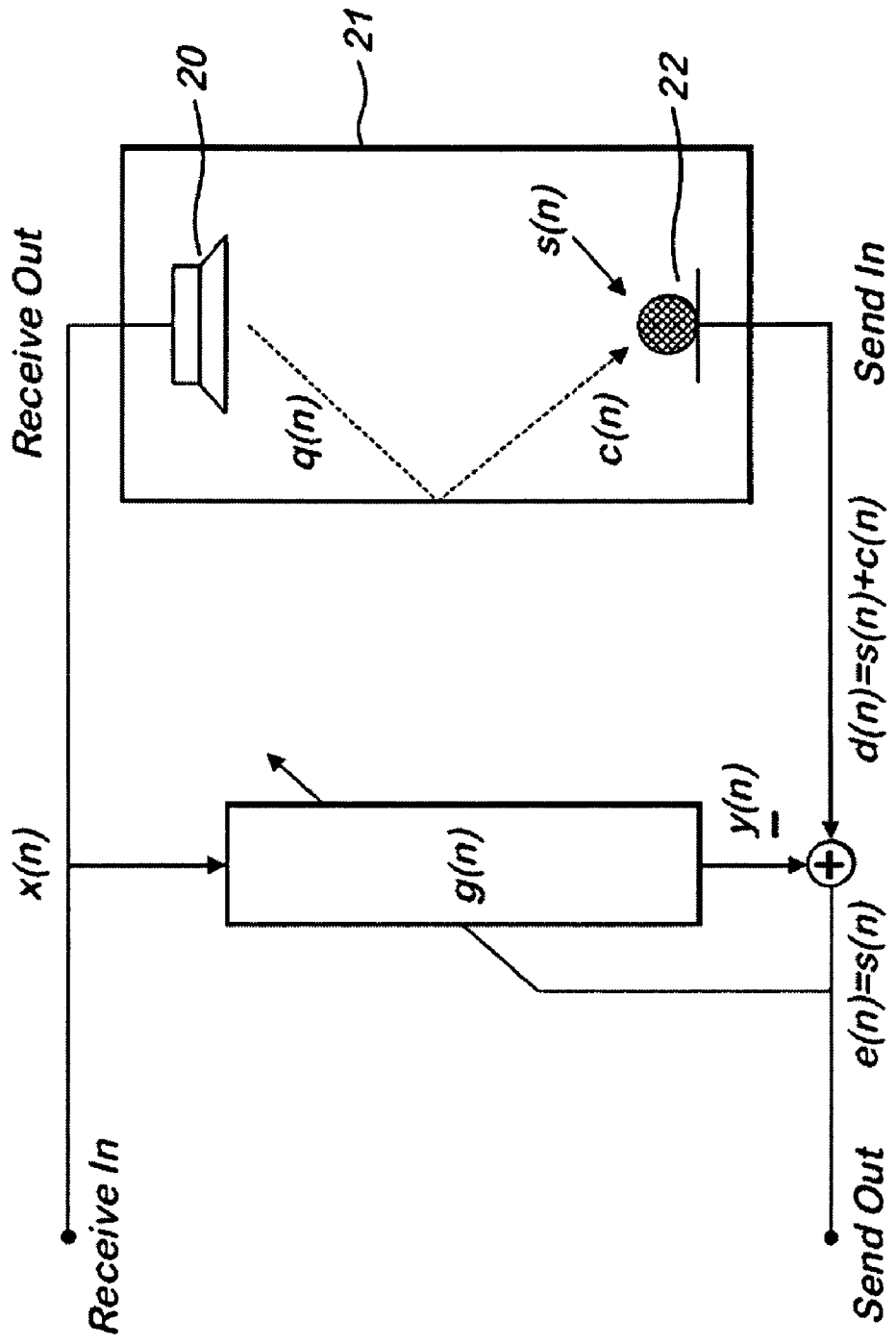
FIG. 2 illustrates acoustic echo cancellation.

FIG. 4 illustrates signal flow in the car kit of FIG. 3, together with the acoustic environment inside a vehicle in which the car kit of FIG. 3 is installed. Like components are numbered in FIG. 4 as in FIGS. 1 to 3.

The DSP 30 of FIG. 3 includes a control unit 40, a delay unit 33 and a filter sensor 34. The control unit 40 controls the switching unit 32 based on a pre-stored algorithm. The control unit has two modes: a probing mode and a normal operation mode. In the probing mode the control unit 40 operates to estimate whether the audio system of a vehicle in which the car kit is installed is taking input from FM transmitter 8 of the car kit. In the normal operation mode the control unit 40 operates the car kit to provide whatever functions are required by the user. The DSP also includes a signal processing section 42, whose components are discussed in more detail below.

The operation of the system in probing mode is as follows. The receiver 10 of the car kit 1 of FIGS. 3 and 4 receives an audio signal. The audio signal passes to a delay unit 33 which applies a delay to the audio signal to form a signal x(n−delay). In the probing mode the control unit 40 causes the switching unit 32 to take the delayed audio signal as input and to pass it for transmission by the FM transmitter 8 of the car kit. The FM signal from FM transmitter 8 can be received by the FM receiver 4 of the audio system of the vehicle in which the car kit is installed. If the FM receiver 4 is set to receive on the channel on which the FM transmitter 8 is transmitting, and if the audio system is set to take input from the receiver 4 then the audio x(n−delay) as received by the receiver 10 and then delayed by the delay unit 33 will be transmitted as audio by the loudspeakers 6 of the audio system. The transmitted audio will propagate in the interior 21 of the vehicle. As explained above with reference to FIG. 2, the characteristics of the interior will modify the propagated audio by a factor $q2(n)$ so that the resulting audio received at the microphone 12 is $c2(n)$ where $c2(n)=x(n-delay)*q2(n)$.

During the probing mode of operation the DSP sets the switching unit to also cause a non-delayed audio signal x(n) to be transmitted from the loudspeaker 9. This introduces a signal x(n) into the interior of the vehicle. The characteristics of the interior will modify the propagated audio by a factor $q1(n)$ so that the resulting audio received at the microphone 12 is $c1(n)$ where $c1(n)=x(n)*q1(n)$.

Two adaptive filters are implemented. A first adaptive filter 36 is implemented between the input to the loudspeaker 9 of the car kit and the input received from the microphone 12. This filter 36 has a response $g1(n)$ which simulates $q1(n)$. A second adaptive filter 35 is implemented between the input to the FM transmitter 8 of the car kit and the input received from the microphone 12 after subtraction of the response of filter 36. This filter 35 has a response $g2(n)$ which simulates $q2(n)$.

In practice there is a maximum tail length that can be covered by adaptive filter 36. This will typically be selected based on the anticipated tail length of $c1(n)$ in a typical range of vehicles in which the car kit may be installed. The delay introduced by the delay unit 33 is selected to be longer than is covered by adaptive filter 36. The result of this is that the presence of the delay introduced by the delay unit 33 will result in an echo in the signal d(n) received at the microphone 12 that cannot be compensated by filter 36. Adaptive filter 35 allows such an echo to be detected. If such an echo is detected then it is taken to represent the fact that the vehicle audio signal is taking the output of the FM transmitter 8 as input.

The signal d(n) received by the microphone is formed of the sum of $c1(n)$, $c2(n)$ and s(n), where s(n) represents sound introduced from other sources such as speech in the vehicle or engine noise. A subtractor operator (which could be implemented by means of an amplifier) 38 forms a signal $e1(n)$ as the difference between d(n) and the response $y1(n)$ of the filter 36 to its stimulus x(n). Thus $e1(n)=s(n)+c2(n)$ in the situation where $y1(n)$ correctly matches $c1(n)$. $e1(n)$ is taken as the adaptive feedback to filter 36 on the basis of which its response $g1(n)$ is determined. Another subtractor operator (which could be implemented by means of an amplifier) 37 forms a signal $e2(n)$ as the difference between $e1(n)$ and the response $y2(n)$ of the filter 35 to its stimulus x(n−delay). Thus $e2(n)=s(n)$ in the situation where $y1(n)$ correctly matches $c1(n)$ and $y2(n)$ correctly matches $c2(n)$. $e2(n)$ is taken as the adaptive feedback to filter 35 on the basis of which its response $g2(n)$ is determined.

A sensor 34 of the DSP 30 senses the current response $g2(n)$ of the filter 35 and passes it to control unit 40. If that response is within a predefined threshold of a null response then that is taken as being representative of there being no delay in the acoustic system that exceeds the tail length of the filter 36. That is taken as indicating that the vehicle's audio system is not taking input from the FM transmitter 8. If the response of the filter 35 differs from null by more than that threshold then that is taken as being representative of there being a delay in the acoustic system that exceeds the tail length of the filter 36, which is taken as indicating that the vehicle's audio system is taking input from the FM transmitter 8. The result of the probing process is stored in controller 40. Once this is stored the controller can enter its normal mode of operation, in which any output from the car kit is not delayed by delay unit 33.

When a phone call is received by the phone transceiver 7 that fact is signalled to the controller 40 via line 41. Using the stored result of the probing process the controller 40 decides how to control the switching unit 32. If the result of the probing process is that the vehicle's audio system is not taking input from the FM transmitter 8 then the controller 40 controls the switching unit to pass the audio output from the transceiver 7 to the loudspeaker 9. If the result of the probing process is that the vehicle's audio system is taking input from the FM transmitter 8 then the controller 40 controls the switching unit to pass the audio output from the transceiver 7 to the FM transmitter 8. In either case the output does not pass through the delay unit 33 so that the roundtrip delay of the telephone call is not increased.

In this way the car kit avoids the need for a manual switch that can select between transmission of the receive-out signal of a phone call to either a wired (9) or a wireless (6) loudspeaker. This has the further advantage that it can reduce the power consumed by the car kit if the vehicle's audio system is set to receive input from the FM transmitter 8 of the car kit because power consumption by the loudspeaker 9 is avoided. Due to its adaptive nature, the present system can be independent of the physical deployment of the microphone and the loudspeakers, and thus provides flexibility in system design.

The output 39 after subtraction of the responses of filters 35 and 36 can be used as input to the transceiver 7 to form the basis of audio for transmission to the other party in a call.

The presence of acoustic echo as indicated by the response of filter 35 can, for example, be determined by the power measurement on the coefficients of the adaptive filter $g2(n)$, or by the ERLE (echo return loss enhancement) measurement provided by $g2(n)$.

The car kit could enter probing mode periodically, for example every 60 seconds, or could do so briefly whenever an incoming call is indicated on line 41, or it could do so continuously whilst a call is being handled by the car kit.

In practice the delay introduced by the delay unit 33 will be determined by taking into consideration the relative delay between the paths for the receive-in signal; i.e. through loudspeaker 9 or through the FM transmitter 8 and the vehicle's audio system.

In order to reduce the computational complexity of the system, a less complex AEC algorithm can be implemented as $g2(n)$, before the detection of $c2(n)$, and in case that a non-null value for the response of filter 35 is detected the full probing mode as described above can be entered.

The invention can also be implemented for other hands-free devices (different from the car kit application), for example, the use of the hands-free device with a home/office FM radio. It also can be usefully implemented in phones that have a speaker phone capability.

Alternative implementations are possible. For example, the same error signal $e2(n)$ can be used to drive the adaptation of both adaptive filters $g1(n)$ and $g2(n)$. In this case, the two adaptive filters would be effectively cascaded into one adaptive filter and each would occupy a different time segment of this combined filter. The two adaptive filters g1(n) and g2(n) can be combined into a single filter g(n) with longer time span that covers both the non-delayed and delayed path. Mathematically, $$c1(n) + c2(n) = q1(n) * x(n) + q2(n) * x(n\text{-delay})$$
$$= q1(n) * x(n) + q2(n\text{-delay}) * x(n)$$
$$= [q1(n) + q2(n\text{-delay})] * x(n)$$

Therefore, if g(n) is equal to [q1(n)+q2(n–delay)], the output y(n)=g(n)*x(n) is equal to the combination of both echo components s1(n)+s2(n). If the delay is sufficient, q1(n) and q2(n–delay) should be separated temporally, and thus are represented by separate segments in the filter g(n). Similar detection techniques on g2(n) can then be applied to the segment of g(n) that corresponds to the delayed path and the same control logic can be applied.

The time delay applied in probing mode could be applied to the receive-out signal to the loudspeaker 9 instead of the one to the FM transmitter 8.

When the system comes to perform an assessment of the environmental echo in order to determine whether another device is receiving and replaying its audio signal it is generally preferred that it transmits its audio signal to that other device at the same time as replaying the audio locally through its own loudspeaker. This has the advantages that the audio will not be inaudible, as it might be if the other device were not replaying the audio signal and the audio were not replayed locally, and that echo detection can generally be performed more reliably. However, in some situations it may be advantageous for the device not to replay audio locally whilst performing echo detection, and then to turn on its local loudspeaker if it is determined to be necessary.

In situations that prohibit inserting differential delay to the two receive-out paths (loudspeaker 9 and FM transmitter 4) it is still possible to apply the present system. In this case, a careful examination of the acoustic environment, the car kit and the car audio system can explore the underlying temporal difference between the two acoustic paths. By appropriate design and physical deployment of the car kit the temporal difference between the two acoustic paths can be enlarged to the level where sufficient information can be determined to estimate whether the vehicle's audio system is taking the FM transmitter 8 as input. Also, the fact that the audio signal that is being transmitted by the device is being replayed by the other device could be detected in other ways. For example, the device could introduce an audio feature such as a tone or distortion into the audio signal that is transmitted to the other device. The first device could then attempt to detect that feature in audio received by its microphone. Detection of the feature would signal that the other device is reproducing the audio. In order to reduce the impact of the feature on a listener, the feature should preferably be of a type that is inaudible or at least difficult to perceive. To achieve this the signal could be of low power or could be outside the range of human hearing. This approach is currently less preferred because it may require more sensitive or higher frequency analysis of the data received by the microphone, and may require the other device to support the reproduction of out-of-band data.

The present invention may also be implemented in devices other than car kits. Examples include mobile loudspeaker phones for use in a car, office or home and satellite location devices. The audio that is transmitted by the device could come from any suitable source, including an internal generator such as a speech synthesiser or music player (e.g. an MP3 player) or an internal cellular phone transceiver.

The source of audio data may, for example, be a Bluetooth/radio receiver, or another wired or wireless connection using a protocol such as Wi-Fi, USB, or even a plain analog audio connection, which could if necessary be converted to the digital domain using an analog-to-digital (A/D) converter.

The device need not transmit the audio data by FM radio to the other device. Depending on the capabilities of the other device it could transmit the data by other means such as another radio protocol (e.g. Bluetooth), a wired connection or an infra-red connection.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An audio handling device comprising:
   a source of audio data;
   a microphone;
   a loudspeaker;
   a transmitter for transmitting audio data;
   modification means for modifying the audio data; and
   a control unit for controlling the operation of the device, the control unit being capable of receiving signals from the microphone and configuring the conveying of audio data from the source to one or both of the loudspeaker and the transmitter;
   the control unit being capable of configuring the device such that during at least a probing period the modification means modifies audio data from the source and the modified audio data is transmitted by the transmitter, and being arranged to select in dependence on data dependent on signals received from the microphone whether to apply audio data from the source to the loudspeaker.

2. An audio handling device as claimed in claim 1, wherein the modification is a delay.

3. An audio handling device as claimed in claim 1, wherein the control unit comprises an echo cancellation unit for cancelling detected echo components in a signal received from the microphone by comparing a signal received from the microphone with a known signal, and the said data dependent on signals received from the microphone comprises the configuration of the echo cancellation unit.

4. An audio handling device as claimed in claim 1, wherein the control unit is capable of configuring the device such that during at least the probing period audio data from the source is applied to the loudspeaker.

5. An audio handling device as claimed in claim 4, wherein the control unit comprises a first adaptive filter coupled so as to form a first filter signal in dependence on a signal applied to the loudspeaker, said first filter signal representing a version of the signal applied to the loudspeaker delayed by a first amount, and the first filter being arranged so as to adjust the said first amount so as to minimise the energy of a signal representing the difference between a signal received at the microphone and the first filter signal.

6. An audio handling device as claimed in claim 5, wherein the control unit comprises a second adaptive filter coupled so as to form a second filter signal in dependence on a signal applied to the transmitter, said second filter signal representing a version of the signal applied to the transmitter delayed by a second amount, and the second filter being arranged so as to adjust the said second amount so as to minimise the energy of a signal representing the difference between a signal received at the microphone and the first and second filter signals.

7. An audio handling device as claimed in claim 6, wherein the said data dependent on signals received from the microphone defines the configuration of the second filter.

8. An audio handling device as claimed in claim 1, wherein the source of audio data is a radio receiver.

9. An audio handling device as claimed in claim 1, wherein the source of audio data is a Bluetooth radio receiver.

10. An audio handling device as claimed in claim 1, wherein the source of audio data is capable of connecting to a telephone and the control unit is configured to automatically begin the said probing period when the source of audio data is signalled by the telephone that a telephone call has commenced.

11. An audio handling device as claimed in claim 1, wherein the device is a car kit.

12. An audio handling device as claimed in claim 1, wherein the modification is the addition of a waveform to the audio data from the source.

13. An audio handling device as claimed in claim 12, wherein the waveform represents a sound that is audible.

14. An audio handling device comprising:
a source of audio data;
a microphone;
a loudspeaker;
a transmitter for transmitting audio data;
a first audio path carrying the audio data;
modification means for modifying the audio data; and
a control unit for controlling the operation of the device, the control unit being capable of receiving signals from the microphone and configuring the conveying of audio data from the source to one or both of the loudspeaker and the transmitter;
the control unit being capable of configuring the device such that during at least a probing period the modification means modifies audio data from the source, one of the audio data from the source and the modified audio data is transmitted by the transmitter and the other is applied to the loudspeaker, and being arranged to select in dependence on data dependent on signals received from the microphone whether to subsequently apply audio data from the source to the loudspeaker.

15. An audio handling device as claimed in claim 14, wherein the modification is a delay.

16. An audio handling device as claimed in claim 14, wherein the control unit comprises an echo cancellation unit for cancelling detected echo in a signal received from the microphone by comparing a signal received from the microphone with a known signal, and the said data dependent on signals received from the microphone comprises the configuration of the echo cancellation unit.

17. An audio handling device as claimed in claim 14, wherein the control unit comprises a first adaptive filter coupled so as to form a first filter signal in dependence on a signal applied to the loudspeaker, said first filter signal representing a version of the signal applied to the loudspeaker delayed by a first amount, and the first filter being arranged so as to adjust the said first amount so as to minimise the energy of a signal representing the summation of a signal received at the microphone and the first filter signal.

18. An audio handling device as claimed in claim 17, wherein the control unit comprises a second adaptive filter coupled so as to form a second filter signal in dependence on a signal applied to the transmitter, said second filter signal representing a version of the signal applied to the transmitter delayed by a second amount, and the second filter being arranged so as to adjust the said second amount so as to minimise the energy of a signal representing the summation of a signal received at the microphone and the first and second filter signals.

19. An audio handling device as claimed in claim 18, wherein the said data dependent on signals received from the microphone defines the configuration of the second filter.

20. An audio handling device as claimed in claim 14, wherein the source of audio data is a radio receiver.

21. An audio handling device as claimed in claim 14, wherein the source of audio data is a Bluetooth radio receiver.

22. An audio handling device as claimed in claim 14, wherein the source of audio data is capable of connecting to a telephone and the control unit is configured to automatically begin the said probing period when the source of audio data is signalled by the telephone that a telephone call has commenced.

23. An audio handling device as claimed in claim 14, wherein the device is a car kit.

* * * * *